March 11, 1969  JEAN-PIERRE AVOT  3,432,372
MANUFACTURE OF CORRUGATED CARDBOARD
Filed Feb. 12, 1965
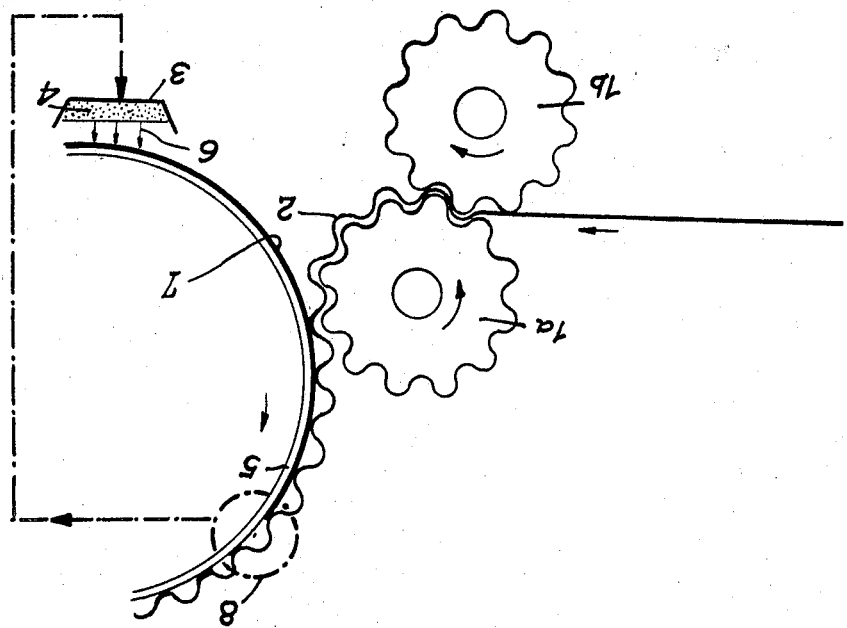

United States Patent Office

3,432,372
Patented Mar. 11, 1969

---

3,432,372
MANUFACTURE OF CORRUGATED CARDBOARD
Jean-Pierre Avot, Neuilly-sur-Seine, France, assignor to Societe Anonyme Anciens Etablissements Walton & Place, Pantin, Seine-Saint-Denis, France, a corporation of France
Filed Feb. 12, 1965, Ser. No. 432,155
Claims priority, application France, Feb. 14, 1964, 963,844; Mar. 7, 1964, 966,560
U.S. Cl. 156—151           6 Claims
Int. Cl. C23c 9/00; B31f 1/22

---

ABSTRACT OF THE DISCLOSURE

A method of manufacturing corrugated cardboard in which pre-heated corrugated sheet is brought into contact with a cover sheet on the surface of which have been electrostatically deposited a uniform layer of dry thermo-adhesive powder. The thermo-adhesive powder becomes partly jellified where it contacts the crests of the pre-heated corrugated sheet, thereby adhesively joining the cover sheet and corrugated sheet together at said crests. The sheets are then allowed to cool and the non-jellified thermo-adhesive powder on the cover sheet between the crests is thereafter recovered and recycled to the supply thereof.

---

The present invention relates to the manufacture of corrugated cardboard.

Corrugated cardboard is generally composed of ribbed elements, generally of paper, known as corrugations, interposed between flat sheets, generally of paper known as cover sheets, glued to the crests of the ribs of each corrugated sheet. There may be distinguished in particular the "double-face" cardboard comprising simply one sheet of corrugation, the "double" cardboard with two sheets of corrugation and the "triple-triple" cardboard with three corrugation sheets.

In order to fix together the corrugated sheets and the cover sheets, use is generally made of a liquid solution of glue which is appied on the crest of each corrugation by means of gluing rollers arranged at the output of the corrugating cylinders, and the cover-sheets and thus applied and glued in position.

The disadvantages of this method of attachment are numerous.

It is in fact necessary to heat the assembled elements so as to eliminate the water from the glue solution, which requires the provision of heating plates, which are bulky and large consumers of energy, at the output of the corrugated machine. In the case of the double-double or triple-triple cardboard, the drying of the cardboard sheet is furthermore particularly long and thus necessitates a low-speed of passage over the heating plates.

In addition, the heating of the cardboard gives rise to a phenomenon known as "tilage," in which the sheet of cardboard assumes the form of a tile due to the differences of amounts of humidity and in consequence of surface tension between the two faces of the plate.

Finally, a method of attachment of this kind cannot be utilized for manufacturing corrugated cardboard from moisture-resistant papers which, by definition, do not absorb the aqueous glue solutions which are enclosed, without any possibility of evacuating the water, between two impermeable materials.

In accordance with the invention, these serious disadvantages are avoided by assembling together a cover sheet and a corrugated sheet, not with a liquid glue but by means of a dry, thermo-adhesive size in powder form, which is fluidized in a tank and is deposited on the cover sheet by creating an electrostatic field between the cover sheet and the tank. The corrugated sheet, previously heated, is then applied against the cover sheet on the face covered with size which ensures the adhesion of the two sheets by becoming jellified at its contact at the level of the crest of the corrugations. It is only necessary then to allow the corrugated sheet and the cover sheet to cool in order to recover the unused dry size which remains between the corrugations, this being re-cycled when so required into the fluidization tank.

The thermal-adhesive size utilized may be of any type known per se, for example polyvinyl acetate, polyvinyl chloride or powdered polyethylene.

In a preferred form of application of the method, the thermo-adhesion of the corrugated sheets and the cover sheets is carried out at the output side of the grooved rollers which serve to form the corrugations. In fact, this forming operation is always carried out in the hot state, and the pre-heating of the corrugated sheets is thus effected by the grooved rollers themselves, without it being necessary to employ any additional heating device, which enables the costs of the adhesive operation to be substantially reduced.

Such a form of application of the process is illustrated diagrammatically in the accompanying drawings, and is described below by way of example and without any implied limitation.

In the drawing, there can be seen two grooved rollers 1a and 1b kept constantly at a high temperature, for example close to 170° C., by a system of heating (not shown). These two rollers cooperate with each other so as to form, in a manner known per se, a corrugated sheet of cardboard 2 which passes between the rollers.

In the immediate vicinity of these rollers is mounted a tank 3 which contains a fluidized thermo-adhesive powder 4, above which is passed a cover sheet 5 of cardboard. An electrostatic field is constantly maintained between the tank 4 and the cover sheet 5 so as to carry away the particles of thermo-adhesive powder along the lines of force 6 of the field and to deposit them on the cover shreet, on the surface of which they form a thin layer 7.

The cover sheet, thus coated with powder, is applied against the corrugated sheet 2 as soon as the latter passes out from between the rollers 1a and 1b, by which it has been pre-heated. In contact with the crests of the ribs of the corrugated sheet, the layer of powder 7 becomes partly jellified and assembles together the corrugated sheet and the cover sheet.

At a distance from the grooved rollers sufficient for the assembled corrugated sheet and cover sheet to have reached the ambient temperature, a nozzle 8 having its axis parallel to the axis of the corrugations sends a jet of air along the latter and projects the non-jellified thermo-adhesive powder which remains between the corrugations in the direction of a recuperation hopper (not shown) which re-cycles this powder towards the fluidization tank.

The invention is of course not limited to the form of application which has been described above.

In particular, it is clear that the pre-heating of the corrugated sheets can be effected by means of any other device than the grooved rollers, and in particular by infra-red radiation heating racks and also the recovery of the dry non-jellified size can be effected by any other means known per se.

What I claim is:

1. A method of manufacture of corrugated cardboard which comprises forming a corrugated sheet, pre-heating said corrugated sheet, electrostatically depositing a uniform layer of dry thermo-adhesive powder on a surface of a cover sheet, applying said surface of the cover sheet with the layer of adhesive powder thereon against the pre-heated corrugated sheet at the crests thereof, whereupon the dry thermo-adhesive powder becomes partly jellified and adhesively joins the cover sheet and corrugated sheet together at said crests, allowing said sheets to cool, and recovering the non-jellified thermo-adhesive powder on said cover sheet between said crests.

2. A method in accordance with claim 1, in which the corrugated sheet and the said cover sheet are paper.

3. A method in accordance with claim 1, in which the non-jellified thermo-adhesive powder is re-cycled to a supply therefor and from which the powder is supplied to the cover sheet.

4. A method in accordance with claim 1, in which the pre-heating of the said corrugated sheet is effected at the same time that the corrugation are formed thereon.

5. A method in accordance with claim 1 comprising maintaining a supply of dry thermo-adhesive powder adjacent said cover sheet, the depositing of the powder on the cover sheet being effected by an electrostatic field between the supply and said cover sheet.

6. A method in accordance with claim 1, in which said thermo-adhesive powder is polyvinyl acetate, polyvinyl chloride or polyethylene.

References Cited

UNITED STATES PATENTS

| 1,796,542 | 3/1931 | Schoo | 161—137 |
| 2,820,716 | 1/1958 | Harmon et al. | 156—272 |
| 2,998,051 | 8/1961 | Sittel | 156—272 |
| 3,037,897 | 6/1962 | Pelley | 156—272 |
| 3,290,205 | 12/1966 | Goldstein et al. | 161—137 |

MORRIS SUSSMAN, *Primary Examiner.*

U.S. Cl. X.R.

156—210, 205, 283, 322, 292; 161—133